Sept. 19, 1967  LEE ROY BROWN  3,343,172
METHOD OF OSCILLOGRAPHIC RECORDING
Original Filed March 2, 1964  2 Sheets-Sheet 1

INVENTOR.
LEE ROY BROWN
BY
ATTORNEY

3,343,172
METHOD OF OSCILLOGRAPHIC RECORDING
Lee Roy Brown, Houston, Tex., assignor to Dresser Industries, Inc., Dallas, Tex., a corporation of Delaware
Original application Mar. 2, 1964, Ser. No. 348,605, now Patent No. 3,235,876, dated Feb. 15, 1966. Divided and this application Mar. 17, 1965, Ser. No. 440,498
8 Claims. (Cl. 346—1)

This invention relates to a novel method for selectively recording multiple variable amplitude, variable density or variable area traces, and further to a method for recording within a fairly large range, any of such traces in an unlimited number of size presentations. This application is a division of my copending application Ser. No. 348,605, filed Mar. 2, 1964, now U.S. Patent No. 3,-235,876.

Since the invention is particularly useful in reflection seismic exploration, an illustrative application of the use of the invention in seismic exploration will be briefly described and the present invention will be considered in connection therewith for purposes of clarity of description. It is to be understood that the present invention is equally applicable to other arts and fields in which a time scale record of transient signal intensity is necessary or desirable.

Briefly, in making seismic surveys by the reflection method, a seismic disturbance is initiated at a selected point on or adjacent the earth's surface and reflected seismic waves are detected at a plurality of points spread out in a selected pattern on the earth's surface. The seismic waves are detected by sensitive instruments, usually geophones, which convert the seismic energy to electrical signals of comparable intensity. These electrical signals are amplified and recorded.

In order that the seismic signals can be examined to determine the seismic characteristics of the area under investigation, the seismic signals are usually presented in a visual manner. The visual presentation may either be made directly in the field by the use of an oscillographic recorder or may be made later on playback equipment from a reproducible record made in the field. The presentation consists of an individual trace for each geophone or geophone group.

Depending on the method of presentation desired, the visual, seismic presentation may be of variable amplitude, or, as it is commonly known, wiggle trace, wherein the record is produced in the form of an oscillatory line whose amplitude of oscillation is proportional to the intensity of the electrical impluses which, in turn, vary in accordance with the intensity of the reflected wave at the geophone. Another well known record is variable area, which is a selected portion of the variable amplitude signal presented as a shaded area of equal intensity. One other well known record is variable density, where the intensity of an area of constant width is proportional to the intensity of the signal.

Oscillographic recorders, used in the field, take the amplified electrical signals from the geophones and convert such signals into a visual photographic record. In such recorders, each amplified signal is supplied to an individual mirror galvanometer in which the mirror oscillates about an axis by an amount dependent upon the instantaneous magnitude and direction, or phase of the seismic signal. The mirrors are positioned to receive light energy from an appropriate light source and to reflect such energy onto a moving light-sensitive record member to form the trace for such geophone or geophone group. Inasmuch as it is usually a requisite that the various traces do not overlap, a channel block, formed of an aperture for each trace, is positioned between the galvanometer mirror and the moving light-sensitive record. The individual apertures of the channel block determine the width of each individual trace. Therefore, once an oscillograph recorder is constructed, the size and position of the trace will remain constant. While this is generally satisfactory and an oscillograph recorder may be designed for any desired trace presentation, there are conditions which make it desirable to change the size of the presentation. Such conditions may be the desire to move readily, delineate and understand the acoustic nature of a difficult area or the desire of a customer to have a different size presentation. In order to change the size of the traces, or the overall width of the presentation of the conventional oscillograph recorder, it is necessary to change the channel block. Since it is a usual requirement that trace spacing maintain a tolerance from no overlap between adjacent traces to a minimum amount of unexposed area between traces, the channel blocks have to be specifically engineered for the required specifications, and the individual apertures of each channel block must be precisely made to close tolerances. Therefore, each channel block is relatively expensive, and can only be used for making the presentation for which it was designed. Hence, to change the size of the traces or of the presentation is expensive and, in addition, time consuming, as the channel block, as well as all of the mirror galvanometers, must be readjusted. Moreover, current requirements cover a range from eight to ninety-six traces per inch; and while one may have a number of channel blocks for various presentations, it is very likely that the one for the desired presentation will not be available. Accordingly, it is an object of the present invention to provide a novel method of oscillographic recording which permits the width of each trace and the overall presentation to be changed over a relatively large range.

Another object is to provide a novel method of oscillographic recording wherein a single aperture which is adjustable in longitudinal position and in width is utilized whereby the size of the overall presentation and the individual traces may be incrementally varied.

A further object is to provide a method of oscillographic recording whereby the width of the individual trace as well as overall width of the presentation may be unlimitedly varied over a relatively large range.

As previously mentioned, visual seismic presentations may be of variable area, variable density or variable amplitude. While oscillographic recorders have been developed to present such presentations individually and in some cases combinations, it would be desirable, in both oscillographic recorders for office playback equipment and in field oscillographic recorders, to be able to switch from one presentation to another in a facile manner. Accordingly, it is a still further object to provide a method of oscillographic recording which will permit selective recording of either variable amplitude, variable density or variable area traces.

The oscillographic recording method of the present invention has means for moving a light-sensitive record in one direction. Optical means defines a recording channel on said record. A plurality of galvanometer mirrors, each mirror being pivotally mounted for oscillation and having means for oscillating in response to a transient input signal, are located a predetermined distance from the record. A light source uniformly illuminates the mirrors. In order to selectively present difference presentations there is means between said light source and said mirrors for selectively changing the light energy transmitted to the mirrors. An adjustable single aperture mechanism is positioned between the mirrors and the light-sensitive record; the aperture mechanism is movable toward and away from said record to change the overall width of the presentation and adjustable in width to change the width of each individual trace.

The novel features which are believed to be characteristic of the invention, both as to its organization and method of operation, together with further objects and advantages thereof, will be better understood from the following descriptions considered in connection with the accompanying drawings in which a presently preferred embodiment of the invention is illustrated by way of example. It is to be understood, however, that the drawings are for the purpose of illustration and description only, and are not intended as a definition of the limits of the invention.

It is expressly understood that, although seismic exploration is used as an application in which the present invention is particularly desirable, it is not limited thereto and may be used in any application of an oscillograph recorder in which it is desirable to obtain an unlimited number of various sized photographic presentations of oscillatory signals. It is to be understood that the present invention may be utilized to obtain a single trace as well as multiple trace.

The term "transient input signals" is used throughout the following specification in reference to those signals which are to be recorded upon a multi-channel, time-scale record. Such input signals in seismic exploration may be the result of a previously recorded record, or may be directly transmitted from field detection units, such as geophones or other types of seismic detectors.

Figure 1:
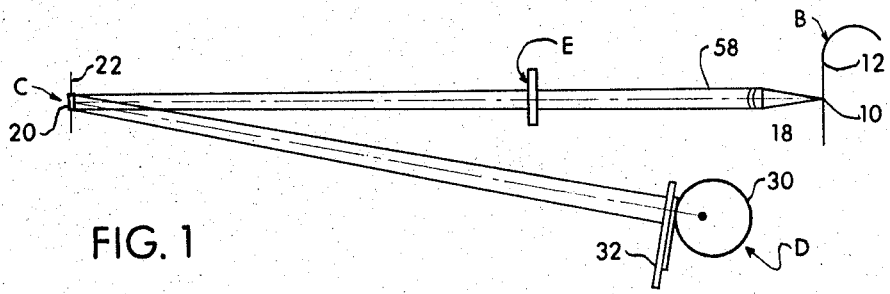
FIG. 1 is a schematic vertical view showing the path of light from the light source to recording medium.

Referring now to the drawings, and particularly FIG. 1, the presently preferred embodiment of the present invention includes, in general terms; a light-sensitive recording section B, a galvanometer mirror section C, a light source section D, and a stop-aperture mechanism E.

The light-sensitive recording section B includes a recording surface 10 for mounting and moving a strip of photosensitive recording medium such as photographic film or a strip of photo-sensitive paper 12. The photo-sensitive strip 12 is positioned in a substantially vertical plane on the recording surface 10 at a predetermined distance from the galvanometer mirror section C. The photo-sensitive strip 12 may be carried across the recording surface 10 from a storage magazine to a receiving magazine by means well known to the art. Since the recording strip 12 is moved at a constant rate of speed in a vertical direction, signals impressed on the strip 12 at a recording station 18, which is vertically stationary, will form a time scale record of such signals. The recording channel has length in the direction of motion of the recording strip 12 and has width in the direction transverse thereto. If an oscillographic recorder is incorporated as a part of office playback equipment, the light-sensitive recording section will usually be comprised of a large revolving drum to which the photo-sensitive medium is attached, as is well known in the art. In such case, there will still be, in effect, a recording surface which will pass a vertical stationary recording channel in a substantially vertical plane.

Galvanometer mirrors are utilized to transform transient input signals into visually recordable signals of magnitude proportional to the intensity of the input signals. The galvanometer section C is positioned a predetermined distance from the recording section B and is formed of a plurality of galvanometer mirrors 20, preferably of the cylindrical type, arranged in side-by-side relation, with one mirror for each channel. Each mirror 20 is affixed to a shaft 22, which is in turn affixed to a movable coil of a galvanometer. The coil of each galvanometer is rotated by an amount proportional to the electrical signal impressed upon it. The intensity of the electrical signal is determined by the intensity of the input signal which, in the case of seismic exploration, is proportional to the intensity of seismic wave received by the respective geophone. Thus, each mirror 20 is rotated about the axis of the shaft 22 through an arc which is proportional to the input signal for the respective channel. The galvanometer mirrors 20 are positioned such that the axis of each shaft 22 is substantially vertical or parallel to the plane of the recording surface 10 at the recording channel 18, or is otherwise so positioned that light impinges upon the mirror 20 from the light source D and is reflected to the recording channel 18 on the photo-sensitive paper strip 12. The image reflected by each mirror oscillates transverse to the direction of movement of the strip 12 at the recording station 18. As the mirror 20 moves about its axis 22 the light reflected thereby is reflected in a horizontal direction or a direction transverse to the direction of movement of the photo-sensitive strip 12.

Figure 4:
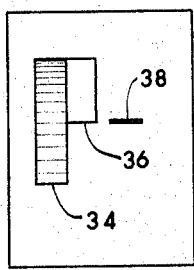
FIG. 4 is a plan view of the sliding lamp aperture.

The light source D is a long straight filament lamp 30. Positioned directly about and in close proximity to the lamp 30 is a sliding lamp aperture mechanism 32 which contains three different apertures; namely, a variable density aperture 34, a variable area aperture 36 and a variable amplitude aperture 38. Depending upon which representation is being recorded, the appropriate aperture will be indexed above the filament of the lamp 30. As can be seen in FIG. 4, the variable density aperture 34 is formed of a gradated glass filter which uniformly changes in light transmission characteristics throughout its length, the variable area aperture 36 is formed of a smaller opening having a piece of clear glass and the variable amplitude aperture 38 is a narrow slot.

Depending upon which trace is desired, such aperture is positioned over the lamp 30. Assuming that it is desired to make a variable area trace, the variable area aperture 36 would be so positioned. Since the aperture 36 is of clear glass, a ray of light of uniform intensity will be transmitted to the mirror galvanometers 20. The bundle of light rays, after passing through the variable area aperture 36, may pass through a cylindrical collimating lens 40 which gathers the light rays and then projects them on a mirror 42 which reflects the light rays onto the mirror galvanometers 20. The optics of the light source section D are so arranged that each mirror 20 of the galvanometer mirror section C uniformly receives a ray of light for transmission to the light-sensitive recording section B. If desired, the light rays, after passing through the lamp aperture 32, may be directed directly to the galvanometer mirrors 20, the important consideration being that the mirrors 20 are uniformly illuminated with light rays of equal intensity, see FIG. 1. Actually, in the case of variable amplitude and variable area, the image of the lamp filament of uniform intensity is transmitted to the mirrors and reflected thereby whereas in the case of variable density the image transmitted to the mirrors and reflected thereby is one of uniformly gradated intensity.

Figure 2:
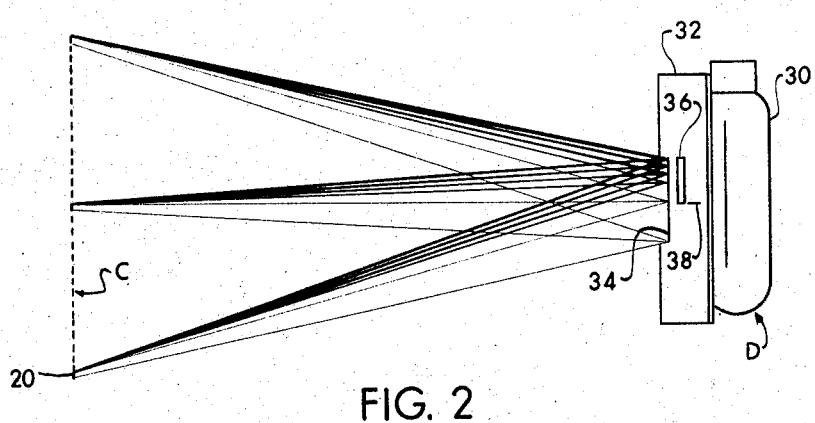
FIG. 2 is a schematic plan view showing the light from light source to galvanometer section in the case of variable density.
Figure 3:
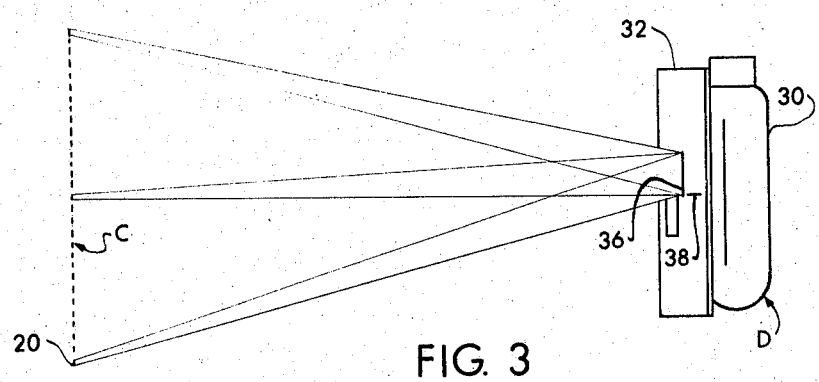
FIG. 3 is a view similar to FIG. 2 for variable area.

FIG. 2 illustrates the gradated light when the variable density aperture 34 is positioned over the lamp 30 and FIG. 3 illustrates the uniform light when the clear aperture 36 is in position.

Figure 6:
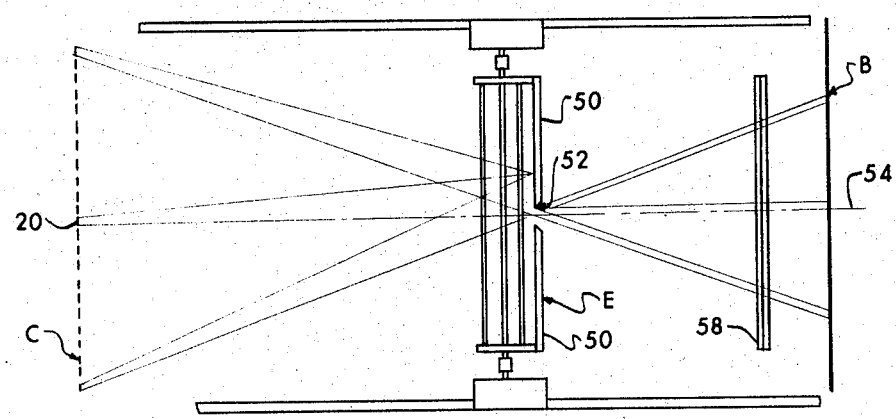
FIG. 6 is a view similar to FIG. 5 for variable area. Also shown schematically is one method of adjusting the width of the opening of the stop aperture and also its longitudinal position.
Figure 7:
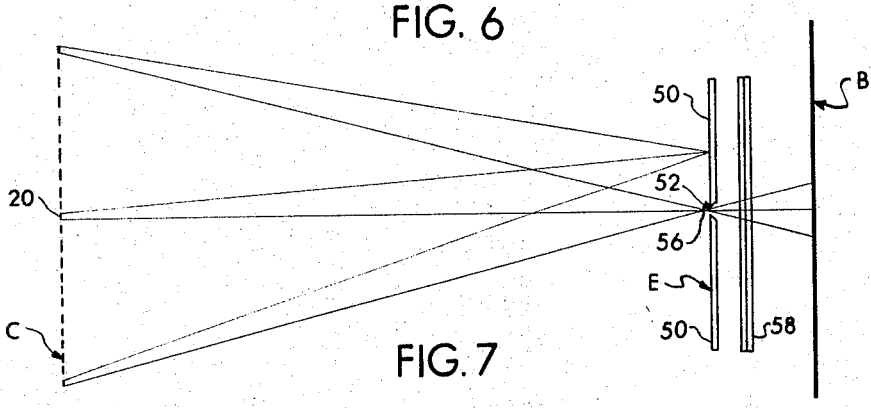
FIG. 7 is a view similar to FIG. 6 with a different setting of the stop aperture.

Positioned between the mirror galvanometer section C and the light sensitive recording section B is the stop aperture mechanism E, which is formed of two adjustable blades 50, having sharp edges 52. The blades 50 are symmetrically centered on a reference center line 54 which extends from the center of the galvanometer section C to the center of the light-sensitive recording section B. The stop aperture mechanism E is so constructed that the blades 50 move simultaneously in relation to the reference center line 54 so that an aperture opening 56 is formed symmetrically of the reference center line 54. FIG. 6 shows a schematic representation of one form of adjusting mechanism for the stop aperture E. Of course, the adjusting mechanism may take other forms, just so the blades 50 move simultaneously whereby the opening formed by the blades is symmetrical with the reference center line. The sharp edges 52 of the blades 50 insure uniform clipping of all traces, thereby eliminating obstruction of the edges of the light ray bundles from the end galvanometers which could result if the edges of the opening had substantial depth. The stop aperture mechanism E regulates the portion of each bundle of light reflected by the individual galvanometer mirrors 20 which is transmitted onto the light-sensitive recording section B. The bundles of light transmitted by the opening 56 of the stop aperture E passes through a cylindrical lens 58 which focuses the bundles of light to a thin line on the recording strip 12 at the recording channel 18, as can be seen in FIG. 1. The opening 56 of the stop aperture E only allows a portion of each bundle of light reflected by each galvanometer mirror 20 to pass through. The amount of each bundle that will pass through the aperture will depend upon the size of the opening 56. The greater the opening the larger the portion, and the smaller the opening the smaller the portion. Increasing or decreasing the width of the opening 56 of the stop aperture E will regulate the size of each individual trace, compare FIGS. 6 and 7. As can be seen in FIG. 6 the opening 56 is larger than the opening 56 in FIG. 7 and accordingly the trace width in FIG. 6 is larger than the trace width in FIG. 7. In addition to being adjustable in width, the stop aperture mechanism E is also movable longitudinally along the reference center line 54. This adjustment regulates the overall width of the presentation. Accordingly, the stop aperture E permits adjustment of the overall size presentation, as well as the size of each individual trace. However, as a rule, the overall width will be keyed to the number of traces per inch or else there will be space between the traces. FIGS. 6 and 7 show this relationship. However, the adjustments of the stop aperture mechanism are independent and if desired the stop aperture can be adjusted to have overlap or space between traces. It has geen found that the individual traces will not overlap or comingle and that each trace will be sharp, and distinct, regardless of whether the apparatus is set for recording 8 traces per inch or 48 traces per inch.

Figure 5:
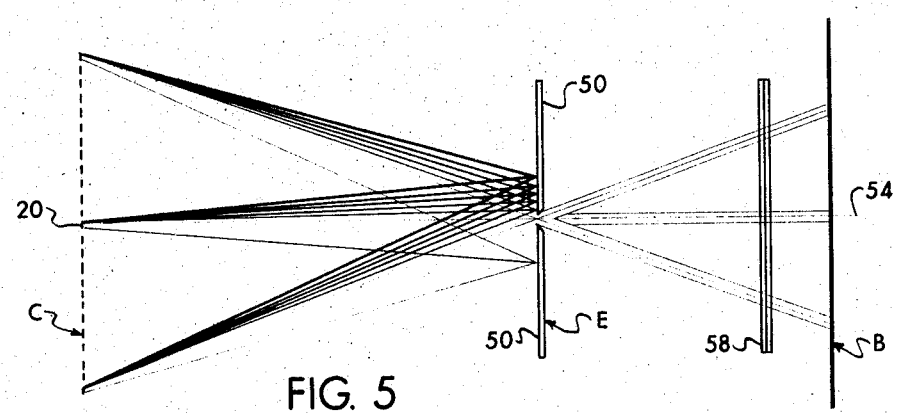
FIG. 5 is a schematic plan view of the light from mirror galvanometer to recording medium in the case of variable density.

One way in which the oscillograph recorder can be set up is to move the blades 50 of the stop aperture mechanism E very close together, approximately .010 of an inch. With the stop aperture so adjusted, the variable amplitude aperture 38 is positioned over the lamp 30. Without having any signal on the galvanometer, the recorder is then turned on to determine whether or not all of the channels are properly recording. If all of the traces are not clear and distinct the individual mirror galvanometers 30 are adjusted so that a clear distinct wiggle trace is obtained for each mirror galvanometer. Each galvanometer should be so adjusted that the center of its light ray will cross the reference center line 34 at the opening 56 of the stop aperture. It has been found that, by so adjusting the galvanometers, the recorder can be changed to record variable area by simply changing the lamp aperture to the variable area aperture, or to variable density by changing the lamp aperture to the variable density aperture. As can be seen in FIG. 5, the center of the ray of light projected by each mirror galvanometer 20 in the case of variable density presentation will cross the reference center line 54 at the opening 56 of the stop aperture E. The same is true for variable amplitude. However, in the case of variable area, one edge of the light rays crosses the reference center line at the opening 56, see FIG. 6. However, in view of the differences in the sizes of the apertures, 34, 36, 38, setting up the recorder as previously described for variable amplitude will automatically position the galvanometers for variable area and variable density as well. After the recorder is properly set up, the mirror galvanometers will thereafter oscillate horizontally in response to transient input signals which are fed to them from the respective geophones, or recorded record. Accordingly, the rays of light reflected by the mirror galvanometers will oscillate in accordance with the intensity of such signals thereby forming the individual traces at the recording channel on the light-sensitive recording medium which will photographically represent the character of the seismic waves received by the geophones. To change the width of the individual traces, the size of the opening 56 of the stop aperture E is changed to obtain the desired size of traces. As can be seen by comparing FIGS. 6 and 7, the larger the opening 56, the wider the trace. Therefore, to increase the width of the individual traces, the size of the opening is increased. It is also customary at the same time to change the longitudinal position of the stop aperture E to obtain a complementary overall width of presentation.

Although the principal advantage of the present method is that an unlimited number of presentations and types of presentations may be made by simple adjustments, it has been found that the use of the gradated density aperture and the single aperture method is particularly adaptable for variable density presentations. Such method of aperturing eliminates the use of special lenses and other apparatus that has been previously used to obtain variable density. By delivering a uniformly gradated beam of light to the galvanometer and passed by the single aperture is recorded on the recording strip as a uniformly gradated area corresponding in intensity with the oscillation of its respective mirror galvanometer which in turn corresponds to the signals delivered thereto. Accordingly, a fixed single aperture and a gradated lamp aperture may be used for recording multiple variable density traces of fixed size. Also the single aperture may be used for recording multiple variable amplitude or variable area traces by use of the proper aperture. Therefore, by using the selective lamp aperture and a fixed single aperture, an inexpensive oscillographic recording method to record fixed size multiple traces selectively of variable amplitude, density or area, results.

Thus, it can be seen that an oscillographic recording method has been disclosed and described which permits selective recording of multiple variable amplitude, variable density or variable area traces and permits incremental adjustment of trace width over a fairly large range, with a minimum of down time for changeover. Having a minimum of down time is particularly advantageous for oscillographic recorders incorporated as part of office playback equipment inasmuch as a considerable amount of equipment may have to remain idle during the changeover.

While a preferred embodiment of the invention has been illustrated and described, it is to be understood that the invention is capable of modifications such as come within the scope of the appended claims.

What is claimed is:

1. The method of photographically recording a multiplicity of seismic wave energies reflected from reflecting subsurfaces, said method comprising:

selectively transmitting to a plurality of oscillable mirror galvanometers a light ray of varying characteristics;

reflecting the selected light ray received by the mirrors to a recording medium;

transmitting electrical signals representing the seismic wave energies to the oscillable mirror galvanometers, whereby the mirror oscillates in response to the intensity of the varying electrical signals;

positioning a single adjustable aperture along the longitudinal axis between the mirror galvanometers and recording medium, whereby the amount of light ray passing through said aperture may be varied thereby varying the width of each reflected signal received by the recording medium.

2. The method of photographically recording seismic wave energy reflected from reflecting subsurfaces comprising:

transmitting a uniform light ray onto an oscillable mirror galvanometer;

reflecting the light ray received by the mirror onto a recording medium;

transmitting an electrical signal representing the seismic wave energy to an oscillable mirror galvanometer, whereby the mirror oscillates in response to the electrical signal;

positioning a single adjustable aperture along the longitudinal axis between the mirror galvanometer and recording medium, whereby the amount of light ray passing through said aperture may be varied.

3. A method of photographically recording a multiplicity of seismic wave energies received from reflecting subsurfaces said method comprising:

transmitting electrical signals representing the seismic wave energies to a plurality of oscillable mirror galvanometers, oscillating the mirror galvanometers in response to the intensities of the varying electrical signals;

transmitting to the oscillable mirror galvanometers a light ray;

reflecting from each mirror galvanometer an individual light ray bundle toward a recording medium;

directing the individual light ray bundles so that they all pass through a common point prior to striking the recording medium; and positioning along the longitudinal axis between said galvanometers and said recording medium at the common point of the reflected light rays a single adjustable stop aperture.

4. A method of photographically recording a multiplicity of seismic wave energies received from reflecting subsurfaces, said method comprising:

transmitting electrical signals representing the seismic wave energies to a plurality of oscillable mirror galvanometers;

oscillating the mirror galvanometers in response to the intensities of the varying electrical signals;

transmitting to the oscillable mirror galvanometers a light ray;

reflecting from each mirror galvanometer an individual light ray bundle toward a recording medium;

directing the individual light ray bundles so that they all pass through a common point prior to striking the recording medium;

positioning along the longitudinal axis between said galvanometers and said recording medium at the crossover of the reflected light ray bundles a single adjustable stop aperture; and adjusting the width of the opening of the stop aperture to define the desired width of each individual reflected light ray bundle on the recording medium.

5. A method of selectively photographically recording the variable amplitude, area or density traces of a multiplicity of seismic wave energies received from reflecting subsurfaces, said method comprising:

transmitting electrical signals representing the seismic wave energies to a plurality of oscillable mirror galvanometers;

oscillating the mirror galvanometers in response to the intensities of the varying electrical signals;

selectively transmitting to the oscillable mirror galvanometers a light ray characteristic of the desired trace;

reflecting from each mirror galvanometer an individual light ray bundle toward a recording medium;

positioning along the longitudinal axis between said galvanometers and said recording medium a single adjustable stop aperture between the mirror galvanometers and recording medium; and directing the individual light rays so that their beams cross at the stop aperture.

6. A method of selectively photographically recording the variable area or density traces of a multiplicity of seismic wave energies received from reflecting subsurfaces, said method comprising:

transmitting electrical signals representing the seismic wave energies to a plurality of oscillable mirror galvanometers;

oscillating the mirror galvanometers in response to the intensities of the varying electrical signals;

selectively transmitting to the oscillable mirror galvanometers a light ray characteristic of the desired trace;

reflecting from each mirror galvanometer an individual light ray bundle toward a recording medium;

positioning along the longitudinal axis between said galvanometers and said recording medium a single adjustable stop aperture between the mirror galvanometers and recording medium;

directing the individual light rays so that their beams cross at the stop aperture; and adjusting the width of the opening of the stop aperture to define the desired width of each individual trace.

7. A method of selectively photographically recording traces of a multiplicity of seismic wave energies received from reflecting subsurfaces, said method comprising:

transmitting electrical signals representing the seismic wave energies to a plurality of oscillable mirror galvanometers;

oscillating the mirror galvanometers in response to the intensities of the varying electrical signals;

transmitting a light ray to the oscillable mirror galvanometers;

reflecting from each mirror galvanometer an individual light ray bundle toward a recording medium;

positioning along the longitudinal axis between said galvanometers and said recording medium a single adjustable stop aperture between the mirror galvanometers and recording medium;

directing the individual light rays so that their beams cross at the stop aperture, the longitudinal position of the stop aperture determining the width of the overall recording; and adjusting the width of the opening of the stop aperture to define the desired width of each individual trace.

8. A method of photographically recording multiple traces of seismic wave energy received from reflecting subsurfaces comprising:

transmitting electrical signals representing the seismic wave energy to a plurality of oscillable mirror galvanometers;

oscillating the mirror galvanometers in response to the electrical signals;

transmitting a uniform light ray onto the oscillable mirror galvanometers;

reflecting from each mirror galvanometer an individual light ray bundle toward a receiving medium;

positioning a single adjustable stop aperture having an opening symmetrical with the center line between the mirror galvanometers and recording medium, the opening of the stop aperture defining the crossover point through which all reflected light rays pass, the position of the stop aperture along the center line determining the overall width of the recording.

References Cited

UNITED STATES PATENTS

| | | | |
|---|---|---|---|
| 2,108,815 | 2/1938 | Gille et al. | 88—61 |
| 2,410,550 | 11/1946 | Padva | 88—61 |
| 2,726,131 | 12/1955 | Skelton | 346—109 |
| 2,783,118 | 2/1957 | Owen | 346—109 |
| 3,011,856 | 12/1961 | Palmer et al. | 346—109 |
| 3,072,907 | 1/1963 | Boucher | 346—1 |
| 3,256,524 | 6/1966 | Stauffer | 346—76 |

RICHARD B. WILKINSON, *Primary Examiner.*

J. W. HARTARY, *Assistant Examiner.*